(12) United States Patent
Herbst et al.

(10) Patent No.: US 12,325,925 B2
(45) Date of Patent: Jun. 10, 2025

(54) FINISHING SYSTEM

(71) Applicant: SST Systems, Inc.

(72) Inventors: Anthony E. Herbst, Sturgeon Bay, WI (US); Bradley M. Andreae, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 534 days.

(21) Appl. No.: 17/723,273

(22) Filed: Apr. 18, 2022

(65) Prior Publication Data

US 2023/0332321 A1 Oct. 19, 2023

(51) Int. Cl.
| | |
|---|---|
| *C25D 17/04* | (2006.01) |
| *B65G 49/04* | (2006.01) |
| *B66D 3/26* | (2006.01) |
| *C25D 17/06* | (2006.01) |
| *C25D 17/10* | (2006.01) |

(52) U.S. Cl.
CPC ......... *C25D 17/04* (2013.01); *B65G 49/0459* (2013.01); *B66D 3/26* (2013.01); *C25D 17/06* (2013.01); *C25D 17/10* (2013.01)

(58) Field of Classification Search
CPC ........ C25D 17/04; C25D 17/06; C25D 17/10; B65G 49/0459; B66D 3/26
See application file for complete search history.

(56) References Cited

U.S. PATENT DOCUMENTS

| | | | |
|---|---|---|---|
| 425,037 A | 4/1890 | Marchant et al. | |
| 547,319 A | 10/1895 | Bardet | |
| 737,846 A | 9/1903 | Jennings | |
| 1,451,625 A | 4/1923 | Montague et al. | |
| 2,567,781 A | 9/1951 | Ransburg | |
| 3,285,570 A | 11/1966 | Sweger | |
| 3,607,711 A | 9/1971 | Koch, II et al. | |

(Continued)

FOREIGN PATENT DOCUMENTS

CN 102745618 A * 10/2012

OTHER PUBLICATIONS

CICSA Toothed and Pocket Wheels Product Literature, website: https://www.cicsa.com/products/round-steel-link-chains/toothed-and-pocket-wheels/, available at least as early as Apr. 27, 2021 (1 Page).

*Primary Examiner* — Brian W Cohen
*Assistant Examiner* — Kevin Sylvester
(74) *Attorney, Agent, or Firm* — Michael Best & Friedrich LLP

(57) ABSTRACT

A finishing system includes a frame that includes a bath station configured to communicate with an electrode. A hoist supported by the frame is movable into register with the bath station to establish electrical communication between the hoist and a current generated by a power source. The current drives deposition of a coating onto a load carried by the hoist. A drive assembly of the system is supported by the hoist and is operable to rotate a sprocket. The drive assembly includes a rotary conductor electrically coupled to the sprocket and configured to come into electrical communication with the frame. An electrically conductive lifting chain is operable through rotation of the sprocket to lower the load into the bath station. The frame communicates current from the power source to the rotary conductor, and the lifting chain communicates current from the rotary conductor to the load.

16 Claims, 10 Drawing Sheets

(56) References Cited

U.S. PATENT DOCUMENTS

| | | | |
|---|---|---|---|
| 3,669,870 | A | 6/1972 | Boost et al. |
| 4,092,440 | A | 5/1978 | Wohr et al. |
| 4,263,122 | A | 4/1981 | Urquhart |
| 5,012,918 | A | 5/1991 | Acker et al. |
| 5,551,552 | A | 9/1996 | Ophardt et al. |
| 5,803,851 | A | 9/1998 | Walenta et al. |
| 6,887,363 | B2 | 5/2005 | Andreae et al. |
| 7,232,392 | B2 | 6/2007 | Hamilton |
| 7,441,749 | B2 | 10/2008 | Beaudoin et al. |
| 8,096,528 | B2 | 1/2012 | Weingartner et al. |
| 8,435,146 | B2 | 5/2013 | Chiu |
| 8,851,455 | B2 | 10/2014 | Rossi et al. |
| 9,512,913 | B2 | 12/2016 | Herzog et al. |
| 9,650,107 | B2 | 5/2017 | Reiter et al. |
| 11,072,501 | B2 | 7/2021 | Andreae |
| 2002/0065160 | A1* | 5/2002 | Christmas .............. B65G 23/16 474/155 |
| 2003/0094363 | A1* | 5/2003 | Andreae ................ C25D 17/20 204/198 |
| 2003/0113473 | A1 | 6/2003 | Mann |
| 2010/0006808 | A1* | 1/2010 | Weingartner ............ B66D 3/26 254/372 |
| 2010/0016107 | A1* | 1/2010 | Klabisch ............... F16H 55/171 474/155 |
| 2014/0342092 | A1* | 11/2014 | Andreae ............ B65G 49/0463 427/430.1 |
| 2020/0088287 | A1 | 3/2020 | Batenburg |

\* cited by examiner

FINISHING SYSTEM

FIELD

The present invention relates to finishing systems and processes for loads, such as manufactured products, parts, workpieces, and/or the like. More particularly, the present invention relates to product finishing systems having hoists that can be used to transport manufactured loads through one or more stages of a finishing process.

BACKGROUND

Finishing processes are known to include an electrophoretic deposition (EPD) or e-coating process, whereby manufactured parts are immersed in one or a sequential plurality of fluids that are charged with electrical current to deposit latent coating material suspended in the fluids onto the immersed manufactured parts.

One such process is described in U.S. Pat. No. 4,772,374, the entire contents of which are hereby incorporated by reference. As another example, a finishing process can include electroplating, whereby manufactured parts are also immersed in one or a sequential plurality of fluids to provide a metal coating on the parts.

The electropainting system disclosed in U.S. Pat. No. 4,772,374 includes at least one movable crane 22 that operates to transfer a workpiece 36 such as a car body held in a carrier unit 30 along a plurality of process stations, or tanks 20. The crane 22 is drivable to move lengthwise along the process line on a pair of elevated horizontal supports 32, 34. Once transported to a next-in-line workstation 20, lift motors 60 of the crane 22 are operated to lower the carrier unit 30 and the workpiece 36 into the process station 20. The crane 22 also operates to oscillate the carrier unit 30 and the workpiece 36 in the process station 20. The crane 22 then operates to lift the carrier unit 30 and the workpiece 36 from the process station 20, before continuing down the process line to the next process station 20. As shown in FIG. 2 with the carrier unit 30 removed, the crane 22 includes a hoist cart 40 and a pair of vertical hoist masts 70, 72. Although the crane 22 may selectively disengage a carrier unit 30 within a predetermined process station 20, thus temporarily "dropping off" a workpiece 36, movement of the crane 22 is constrained to the linear movement along the process line between the first and last process stations 20.

Other typical finishing processes may include a hoist incorporating lifting chains attached between a gear and a part loadbar. Other typical finishing processes may include a hoist incorporating lifting straps, such as nylon straps, polyester straps, or the like, attached between a roller and a part rather than a part loadbar.

SUMMARY

In one aspect, the invention provides a finishing system including a frame extending in a process direction along a path including a plurality of stations each configured to receive and treat a load, the plurality of stations including an immersion station in which the load is immersible in a liquid, a coating material suspended in the liquid, the coating material configured to be electrophoretically deposited on the load, a power supply operable to generate electrical charge, a hoist moveable along the process direction through the plurality of stations, a rotary conductor supported by the hoist, the rotary conductor being electrically connected to the power supply when the hoist is positioned at the immersion station, an electrically conductive lifting chain configured to support the load, an electrically conductive sprocket coupled to the rotary conductor and meshed with the lifting chain, the load vertically moveable with the lifting chain relative to the frame in response to rotation of the sprocket, and a path of conduction between the load and the power supply established through the rotary conductor, the sprocket, and the lifting chain. Charge is supplied along the path of conduction to drive electrophoretic deposition of coating material onto the load.

In another aspect, the invention provides a finishing system including a frame extending in a process direction along a path including a bath station configured to communicate with an electrode, a hoist supported by the frame and movable into register with the bath station to establish electrical communication between the hoist and a current generated by a power source, the current to driving deposition of a coating onto a load carried by the hoist, and a drive assembly supported by the hoist and operable to rotate a sprocket, the sprocket configured to vertically move the load. The drive assembly includes a rotary conductor electrically coupled to the sprocket and configured to come into electrical communication with the frame, and an electrically conductive lifting chain drivably meshed with the sprocket and supporting the load, the lifting chain being operable through rotation of the sprocket to lower the load into the bath station in which the load is immersed in a liquid and raise the load out of the liquid. The frame communicates current from the power source to the rotary conductor, and the lifting chain communicates current from the rotary conductor to the load.

In another aspect, the invention provides a method of operating a finishing system including providing a plurality of stations along a frame in a process direction, each station configured to receive and treat a load, positioning an immersion station along the process direction, suspending a latent coating material in a liquid provided in the immersion station, operating a power supply to generate electrical charge to the frame and the liquid, providing a hoist moveable along the process direction through the plurality of stations, the hoist including an electrically conductive lifting chain and an electrically conductive sprocket meshed with the lifting chain, moving the hoist into register with the immersion station, electrically communicating the power supply and the sprocket through the hoist, connecting the load to the lifting chain, immersing the load in the liquid, establishing a path of conduction between the sprocket and the load solely through the lifting chain, and driving electrophoretic deposition of the coating material onto the load through the electrical charge generated by the power supply.

Other aspects of the invention will become apparent by consideration of the detailed description and accompanying drawings.

DETAILED DESCRIPTION

Before embodiments are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items.

Figure 1:
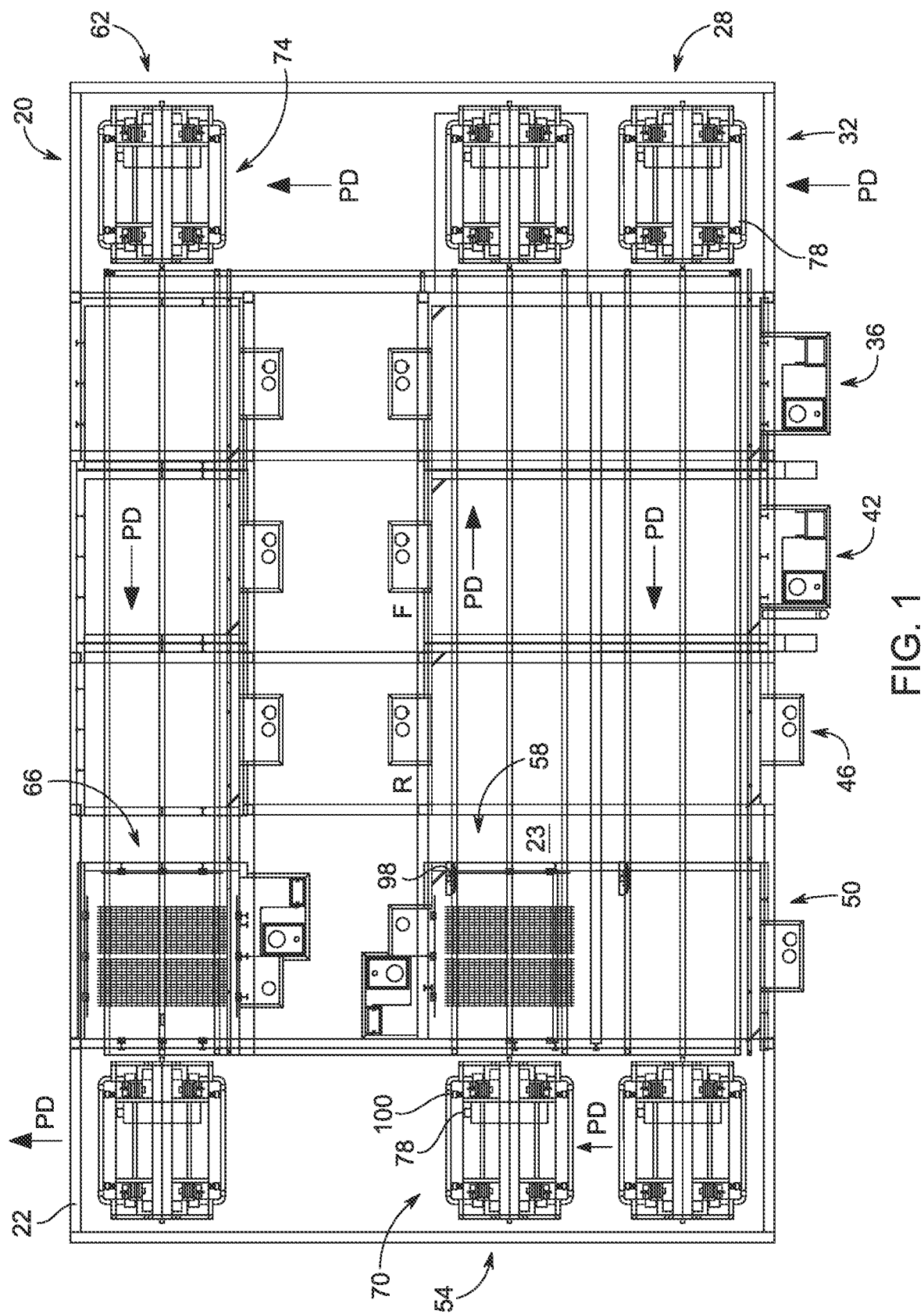
FIG. 1 is a top plan view of a finishing system according to one embodiment of the present disclosure.
Figure 2:
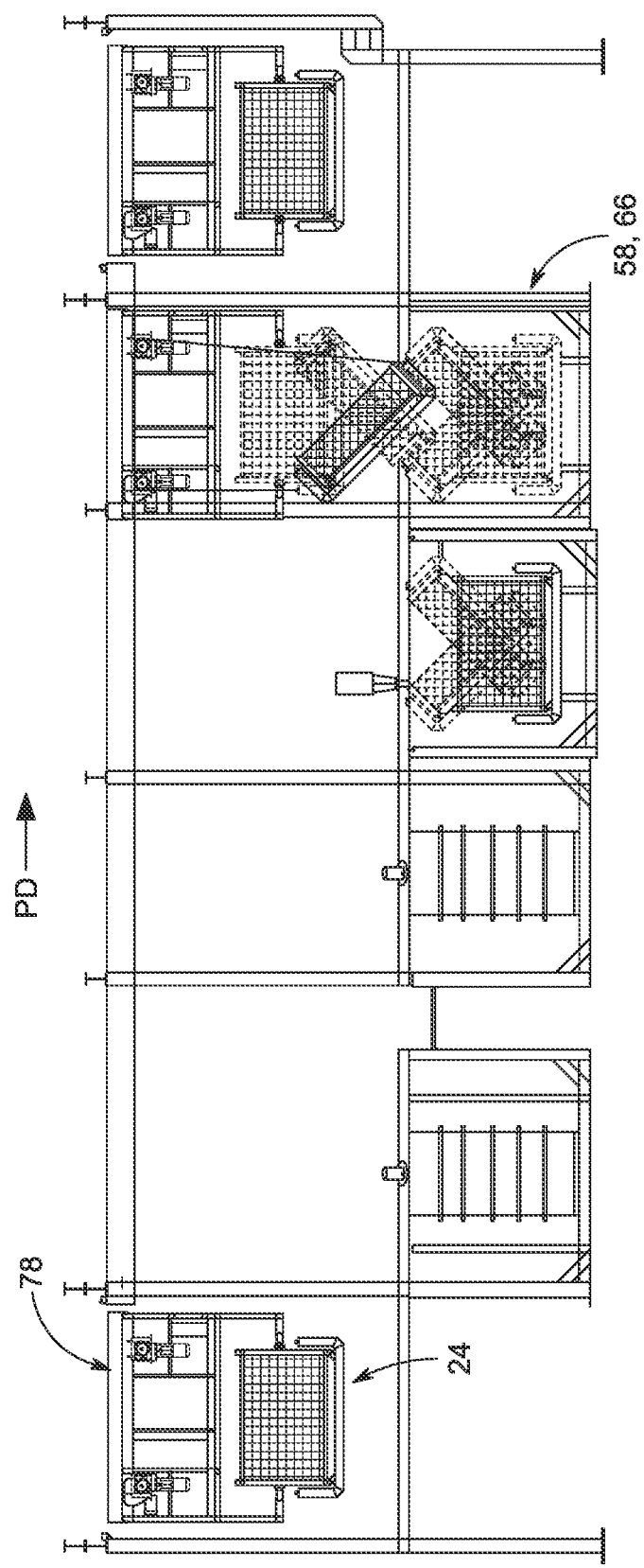
FIG. 2 is a front elevation view of the system of FIG. 1.
Figure 3:
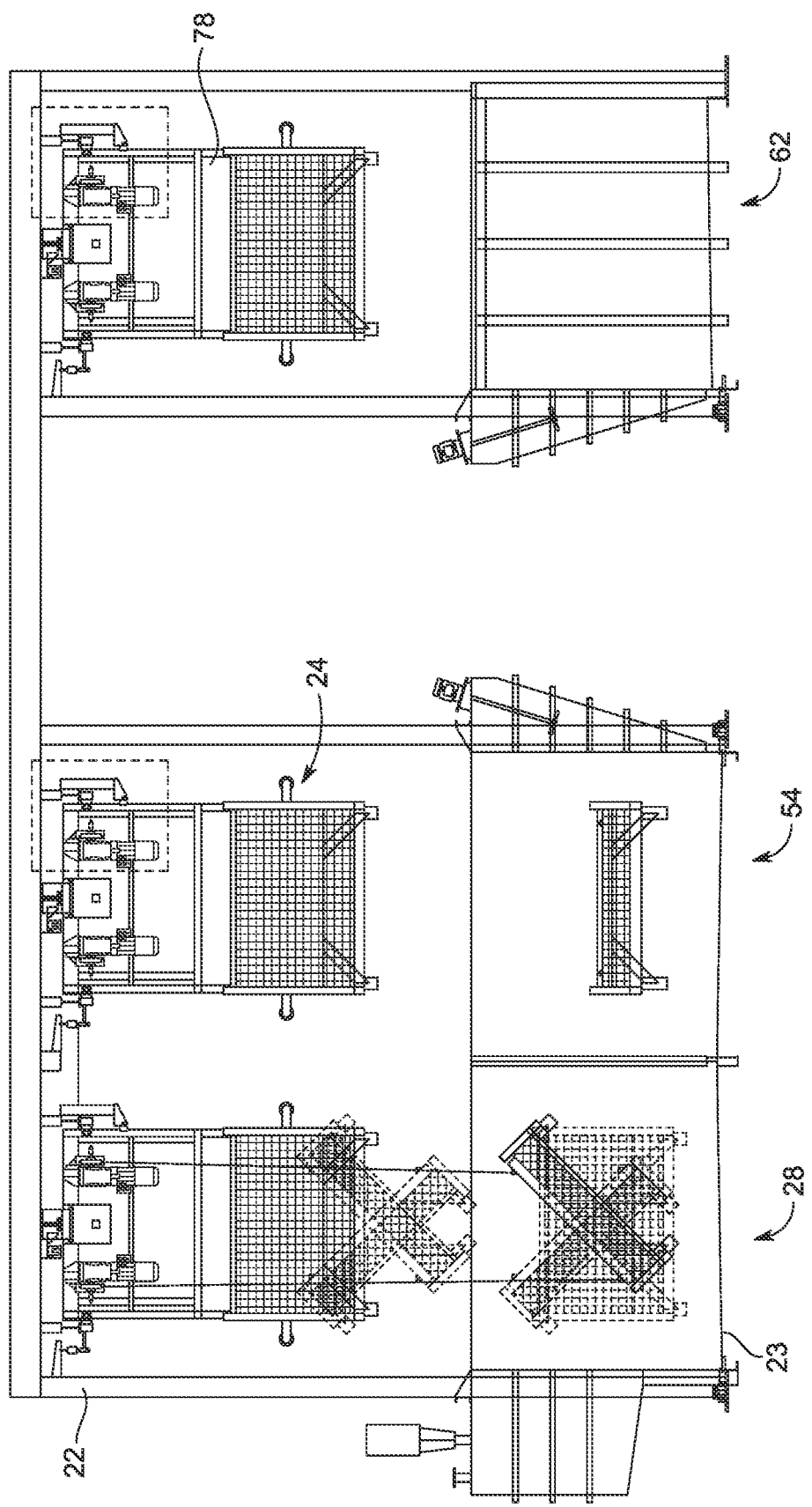
FIG. 3 is a side elevation view of the system of FIG. 1.

FIGS. 1-3 illustrate a finishing system 20 including a frame 22 defining a plurality of work stations that form multiple process lines extending along a process direction PD, as shown in the plan view of FIG. 1 and elevation views of FIGS. 2 and 3. Some or all of the work stations can include immersion tanks 23 filled with liquid for cleaning, rinsing, and/or coating a load 24, such as a manufactured product, part, workpiece, and/or the like, conveyed through the process lines. In some constructions, the finishing system 20 can further include additional non-immersion work stations, such as spray stations, heating or oven sections, or inspection stations, among others. In any case, each work station can be configured to treat the loads 24 in some manner. Additional stations along the process lines may be provided for other purposes besides load treatment (e.g., inspection, queueing, workpiece handling, etc.).

In some constructions, the work stations of the finishing system 20 can include combinations of the following: Spray Pre-Clean/Deluge; Spray Alkaline Cleaner; Immersion Alkaline Cleaner; Spray DI/RO Rinse; Immersion DURO Rinse; Immersion Conversion Coating; Spray DI/RO Rinse; Immersion DI/RO Rinse; Immersion E-Coat with Halo Rinse; Spray Permeate Rinse; and Immersion Permeate Rinse. Thus, different forms of treatment can be performed by the different work stations as part of one overall finishing process (e.g., e-coating, or electroplating).

As described below, the work stations may be subdivided into different portions or groups, such as a pre-treatment portion (e.g., process steps prior to application of a finish or "coating" onto the workpiece), and a coating portion. The coating portion may also include post-treatment work stations for treating the load 24 after the coating is applied (e.g., for enhancing, curing, or completing the coating).

In some constructions, the process direction PD of the process lines extends along three generally straight lines, as the rows of work stations are laid out in offset linear rows. Although less common, it is also possible for the work stations to be laid out along arcs, curves, or other non-linear rows such that the corresponding direction is non-linear.

Referring to FIG. 1, the illustrated finishing system 20 includes three process lines, each having a plurality of stations or stages that may be housed in/by the frame 22. In general, terms, each stage is configured to receive and treat the load 24. A first line 28 of the multiple process lines includes a conveyor (e.g., of the finishing system 20) entrance 32 followed subsequently by an immersion pre-rinse stage 36, an immersion cleaning stage 42, and first and second immersion rinse stages 46, 50. A second line 54 of the multiple process lines includes a first e-coat immersion stage 58 and a third line 62 of the multiple process lines includes a second e-coat immersion stage 66 as well as, in some constructions, a conveyor exit. The finishing system 20 further includes a first lateral transfer stage 70 between the first line 28 and the second line 54 and a second lateral transfer stage 74 between the second line 54 and the third line 62.

In some constructions, the load 24 can include individual or assembled workpiece(s), a frame, a basket, and/or the like. In some operations, the load 24, such as a mesh basket, retains or otherwise supports another portion of the load such as one or a plurality of manufactured parts, workpieces, etc. The illustrated finishing system 20 may, in some applications, obviate the separate workpiece carrier such that a hoist 78 (e.g., overhead crane unit, hoist mechanism, etc.) directly supports the item to be finished, as discussed in further detail below.

Referring now to FIGS. 2 and 3, the hoist 78 is moveably supported by the frame 22 through the plurality of stages. Stated another way, the hoist 78 is configured for movement (e.g., by an on-board drive, which may include one or more electric motors) along the frame 22 to traverse the plurality of stages. In particular, the hoist 78 conveys one or more associated loads 24 along the process direction PD. That is, the hoist 78 and load(s) 24 are moveable through the plurality of stages together. The hoist 78 is further configured to selectively raise and lower the load 24, such that the hoist 78 may or may not lower and raise the load 24 at each one of the plurality of stages.

Figure 4:
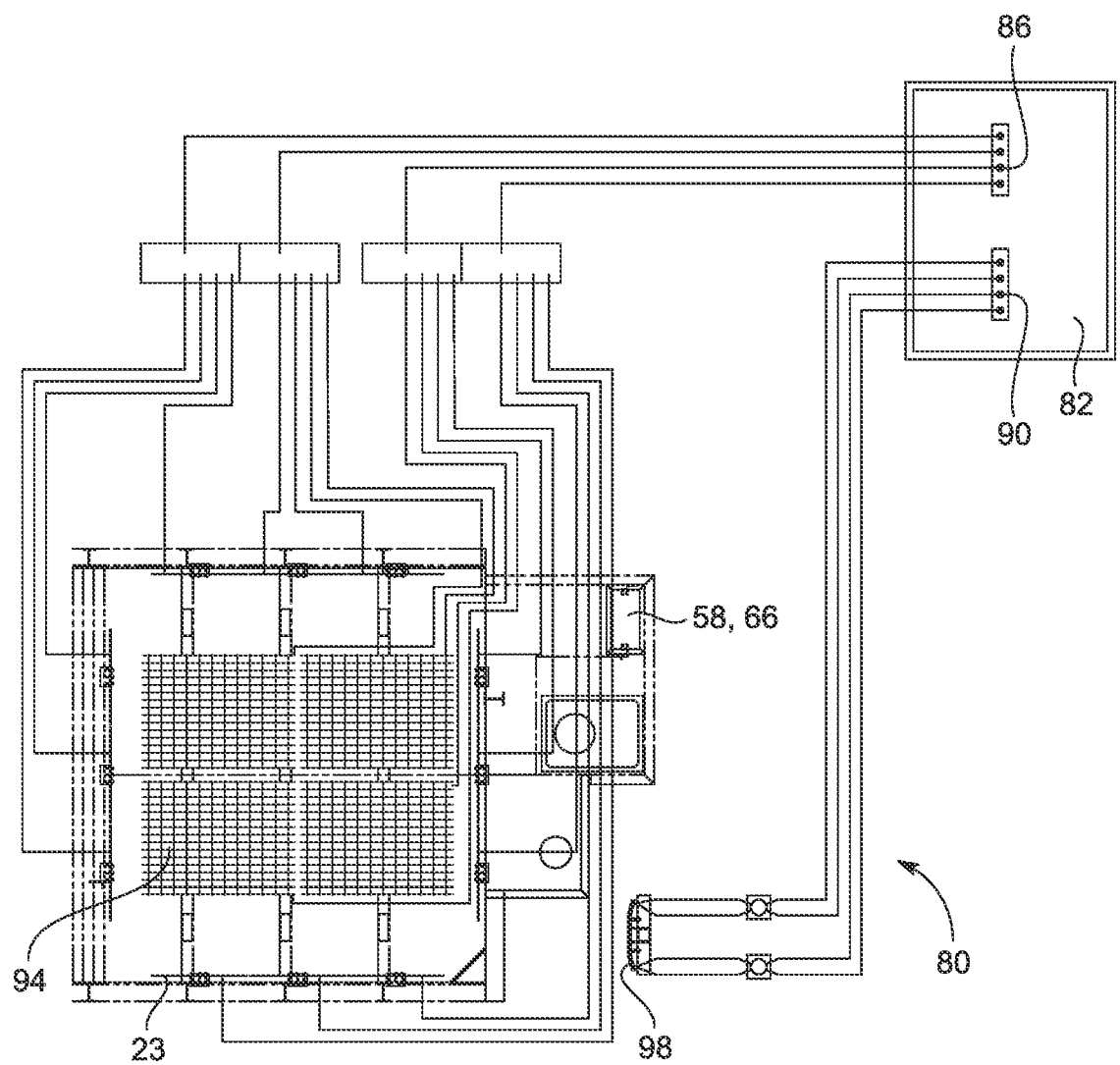
FIG. 4 is a schematic view illustrating circuitry of an anodic or cathodic system for a coating station of the system of FIG. 1.

In addition to moving the load 24 between stages, the hoist 78 operates, at stages in which the load 24 is immersed in a liquid bath (e.g., a coating fluid present in either of the e-coat stages 58, 66), to lower the load 24 into the liquid bath, and to raise the load 24 out of the liquid bath. The hoist 78 may further operate to tilt or oscillate the load 24 through selective manipulation of separate ends or sides of the load 24. The hoist 78 further provides tilting and/or other manipulation of the load 24, such as reorientation from a nominal orientation, either in the liquid bath, directly above the liquid bath, or both. A conduction path 80, as partially shown in FIG. 4, is established between a power supply 82 and the load 24 through integral portions (e.g., structures, frames, load bearing members, etc.) of the system 20 rather than through a separate wire or connector. In operation of the hoist 78, the conduction path 80 accommodates the tilting and/or other manipulation of the load 24 described herein.

The process of e-coating relies on the drive of coating material (e.g., paint, zinc, laminate, and/or the like) suspended in the liquid bath onto the load 24 when components of the e-coating process are electrically charged with electrical current. In particular, when the illustrated path of conduction 80 is continuous (e.g., in either of the e-coat stages 58, 66) so that the voltage potential from the power supply 82 can generate a current, coating may be deposited onto the load 24.

With reference to FIG. 4, according to one example arrangement of the disclosure, the path of conduction 80 or "e-coat circuit" includes the power supply 82 having negative leads or terminals 86 and positive leads or terminals 90. In the illustrated embodiment, the power supply 82 providing charge to the e-coat circuit 80 is or includes a DC rectifier. In other embodiments, by way of example, the power supply is an AC power source combined with a converter, invertor, and/or the like.

Before the relative cathodic and anodic designations are made with reference to the illustrated embodiment of FIG. 4, it should be understood that the finishing system 20 of the present disclosure can be arranged as a cathodic coating system or an anodic coating system. Regardless of charge/polarity arrangement, the structure through which the path of conduction 80 is provided is substantially the same, although relative sings (i.e., +/−) and/or directions of charge (e.g., ion) may be reversed or different based on a desired coating application (e.g., cathodic e-coat stage, anodic e-coat stage, etc.). For example, the first e-coat stage 58 may be an anodic or cathodic e-coat stage, and the second e-coat stage 66 may be another anodic e-coat stage or a cathodic e-coat stage. With the above clarification in mind, the illustrated embodiment will now be described for an anodic e-coat arrangement.

With continued reference to FIG. 4, a negative lead 86 of the rectifier 82 is connected (e.g., through a wire, connector, terminal box, direct contact, and/or the like) to a first electrode 94 positioned in the e-coat stages 58, 66. In the illustrated embodiment, the first electrode 94 is embodied as cathode plates submerged in coating liquid held within a tank 23, which is present in the first e-coat stage 58. A positive side 90 of the rectifier 82 is connected to a bracket, such as a shoe 98, either through a designated connector (e.g., wire) or through a portion of the frame 22, or through other means. The shoe 98 is presented for contacting the hoist 78 (FIG. 5) in the e-coat stages 58, 66, such that the hoist 78 is moveable into register with the shoe 98 to provide electrical communication from the rectifier 82 to the hoist 78. Similarly, movement of the hoist 78 away from the e-coat stages 58, 66 (e.g., disconnected, out of register, etc.) is configured to break the path of conduction 80 between the shoe 98 and the rectifier 82, which breaks the path of conduction 80 between the rectifier 82 and the load 24.

For example, with brief reference to FIG. 1, the shoe 98 may be supported by the frame 22 and offset laterally from the tank 23 to allow the hoist 78 to move linearly into contact with the shoe 98. More particularly, the hoist 78 includes a contact portion 100 configured to abut against the shoe 98. The contact portion 100 and shoe 98 may engage one another through a number of ways, depending on construction. In some embodiments, by way of example, at least one of the shoe 98 and the contact portion 100 is brushed and provides a brushed connection. When contacting the shoe 98 (e.g., via the contact portion 100), the hoist 78 is positioned directly above the tank 23 in the e-coat stages 58, 66 such that the load 24 carried on the hoist 78 is suspended in a position above the cathode plates that form the first electrode 94 and ready to be lowered into the coating liquid.

With specific reference to FIG. 5, the path of conduction 80 from the shoe 98 to the hoist 78 will be described in greater detail. From FIG. 4, the illustrated e-coat circuit 80 continues from the rectifier 82 and shoe 98 to the hoist 78 while the hoist 78 is in the position illustrated in FIG. 5. In some constructions, a portion of the frame 22 (e.g., a mount, support, and/or the like) is charged such that the shoe 98 and the portion of the frame 22 share a common charge. In other constructions, a connector extends from the rectifier 82 to the shoe 98. Referring back to FIG. 5 the hoist 78 is illustrated in the position above the tank 23 and in contact with the shoe 98.

Figure 5:
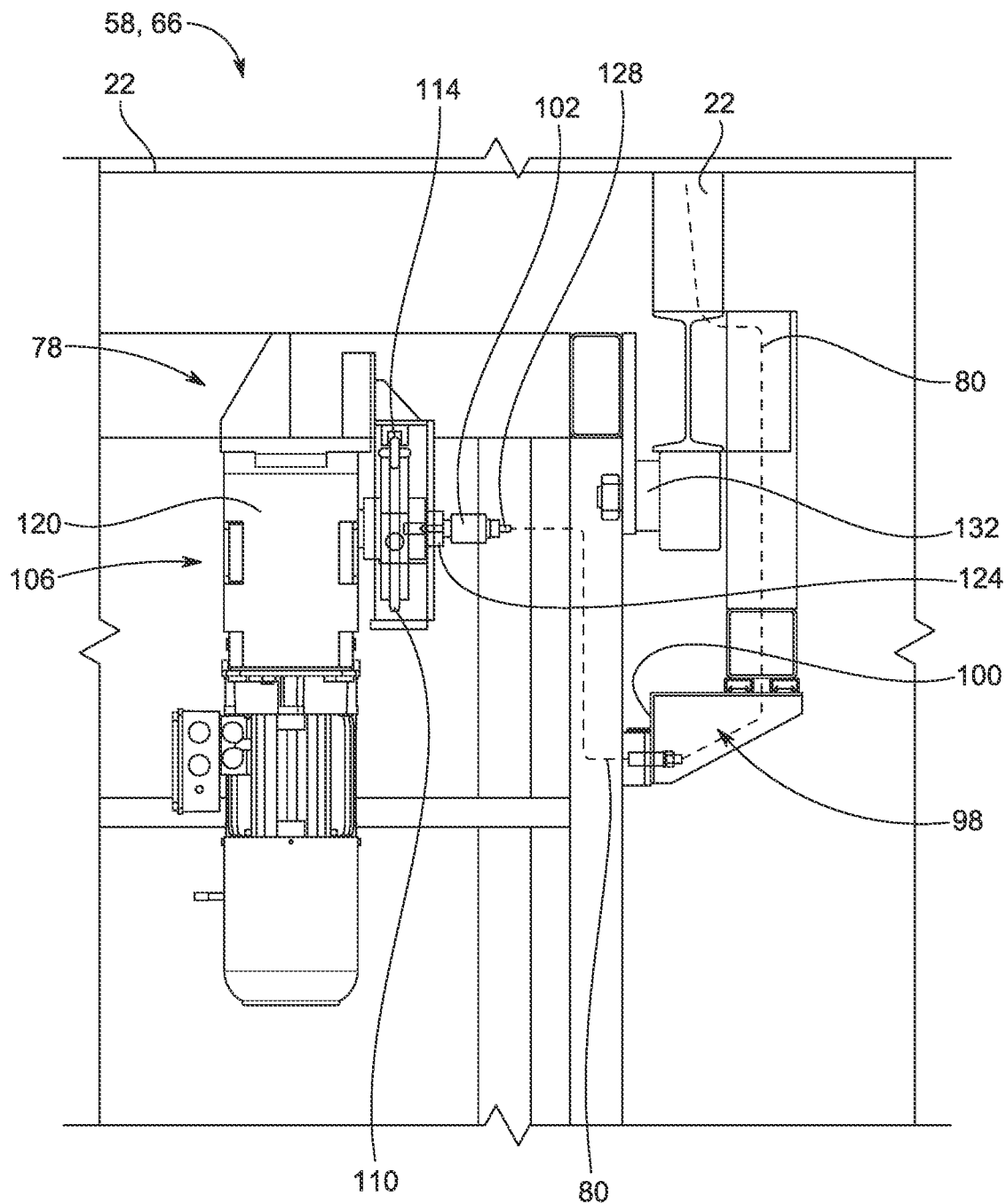
FIG. 5 is an enlarged view of the callout portion of FIG. 3, illustrating a hoist and a lifting mechanism of the coating station.

FIG. 5 further illustrates another portion of the e-coat circuit 80, which is supported by the hoist 78 to deliver charge from the shoe 98 to a rotary conductor 102. Accordingly, FIG. 4 illustrates circuitry from the rectifier 82 to the shoe 98, and FIG. 5 illustrates circuitry from the shoe 98 to the rotary conductor 102. In the illustrated embodiment, the rotary conductor 102 may serve as a rotary ground. In some constructions, by way of example, the rotary conductor 102 is an ERG-400-01, commercialized by Meridian Laboratory.

In the illustrated embodiment, the rotary conductor 102 is supported by a drive assembly 106, such as a lifting mechanism, mounted to and moveable together with the hoist 78. The lifting mechanism 106, which can provide vertical movement of the load 24, can include a drive link 110 that supports a lifting chain 114. The load 24 is suspended from the lifting chain 114, which provides a hoist line for raising/lowering the load 24. The driving link 110 is embodied as a gear or sprocket 110, but could be a pulley mechanism or other drivable (e.g., rotational, translational, etc.) member suitable to receive links 118 of the chain 114. In another embodiment, by way of example, the load 24 may be suspended from another conductive hoist line, such as a metallic tether, flexible line, or conductive strap, that is suitable to engage the drive link 110 (e.g., sprocket, pulley, etc.).

Figure 6:
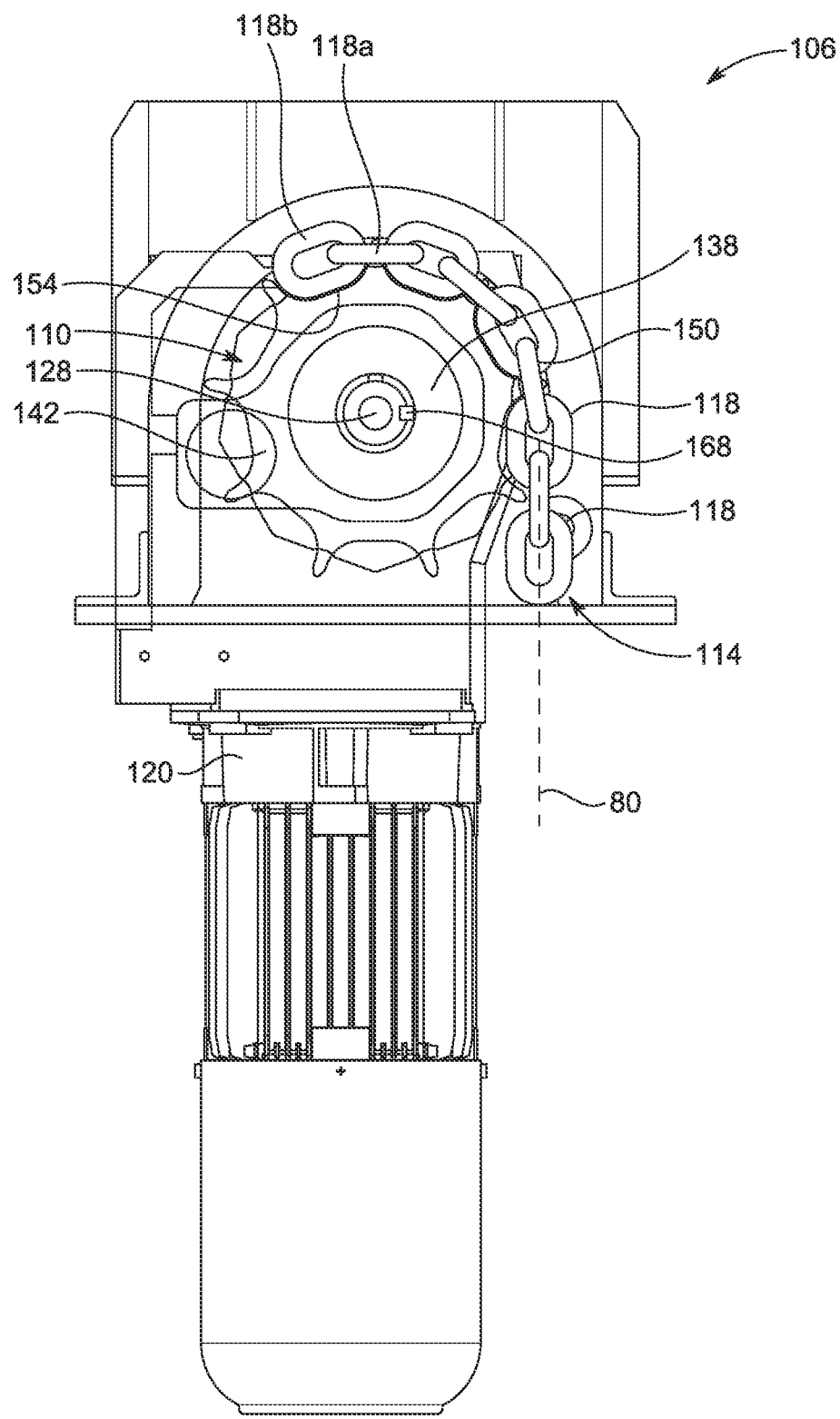
FIG. 6 is an isolated front view of the lifting mechanism called out in FIG. 5, illustrating a sprocket assembly of the lifting mechanism.

In the illustrated embodiment, the chain 114 is a lifting chain 114 formed by a series of the links 118 (see FIG. 6) that are connected together in alternating orientations. The lifting chain 114 and the links 118 thereof are constructed of electrically conductive material, e.g., steel. In some embodiments, the links 118 are formed of an alloy or high test material having a grade between approximately 40 (e.g., G43) and approximately 120 (e.g., G120), such as a G80 alloy chain. In the illustrated embodiment, the links 118 form of a grade 100 alloy lifting chain (e.g., G100). G100 alloy lifting chains having a net weight of approximately 750 pounds (e.g., 748 pounds) and length of approximately 200 feet have a working load limit or rated capacity of 22,600 pounds. Links for such typical G100 alloy lifting chains have a total size of approximately ⅝ inches (~16 mm), a wire diameter of approximately 0.639 inches, a nominal inside diameter length of approximately 1.960 inches, and a minimum inside diameter width of approximately 0.870 inches. Links of a similar G80 alloy chain (e.g., weight of ~725 pounds, length of ~200 feet, load limit of 18,100 pounds) have a total size of approximately ⅝ inches (~16 mm), a wire diameter of approximately 0.625 inches, a nominal inside diameter length of approximately 1.960 inches, and a minimum inside diameter width of approximately 0.870 inches.

The lifting chain 114 (e.g., via the links 118) is drivably meshed with the sprocket 110 and can be coupled to the load 24. In the illustrated arrangement, the lifting mechanism 106 also includes a motor 120 (e.g., electric motor). The motor 120 is coupled to the sprocket 110, via a direct or geared connection, and drives rotation of the sprocket 110. As the sprocket 110 is rotated, the lifting chain 114 rides the sprocket 110 such that the load 24 can be either raised from the fluid or lowered into the fluid depending how the load 24 is being treated (e.g., coated, about to be coated, etc.).

The sprocket 110 is mechanically coupled to and electrically connected with the rotary conductor 102 such that the sprocket 110 and at least a portion of the rotary conductor 102 co-rotate as the motor 120 drives the sprocket 110. A mount face 124 of the rotary conductor 102 couples directly to the sprocket 110, and a shaft 128 of the rotary conductor 102 connects with the shoe 98. In the illustrated arrangement, the rotary conductor 102 conducts charge from the shoe 98 and to the sprocket 110, such that the sprocket 110 forms a portion of the e-coat circuit 80.

Figure 8:
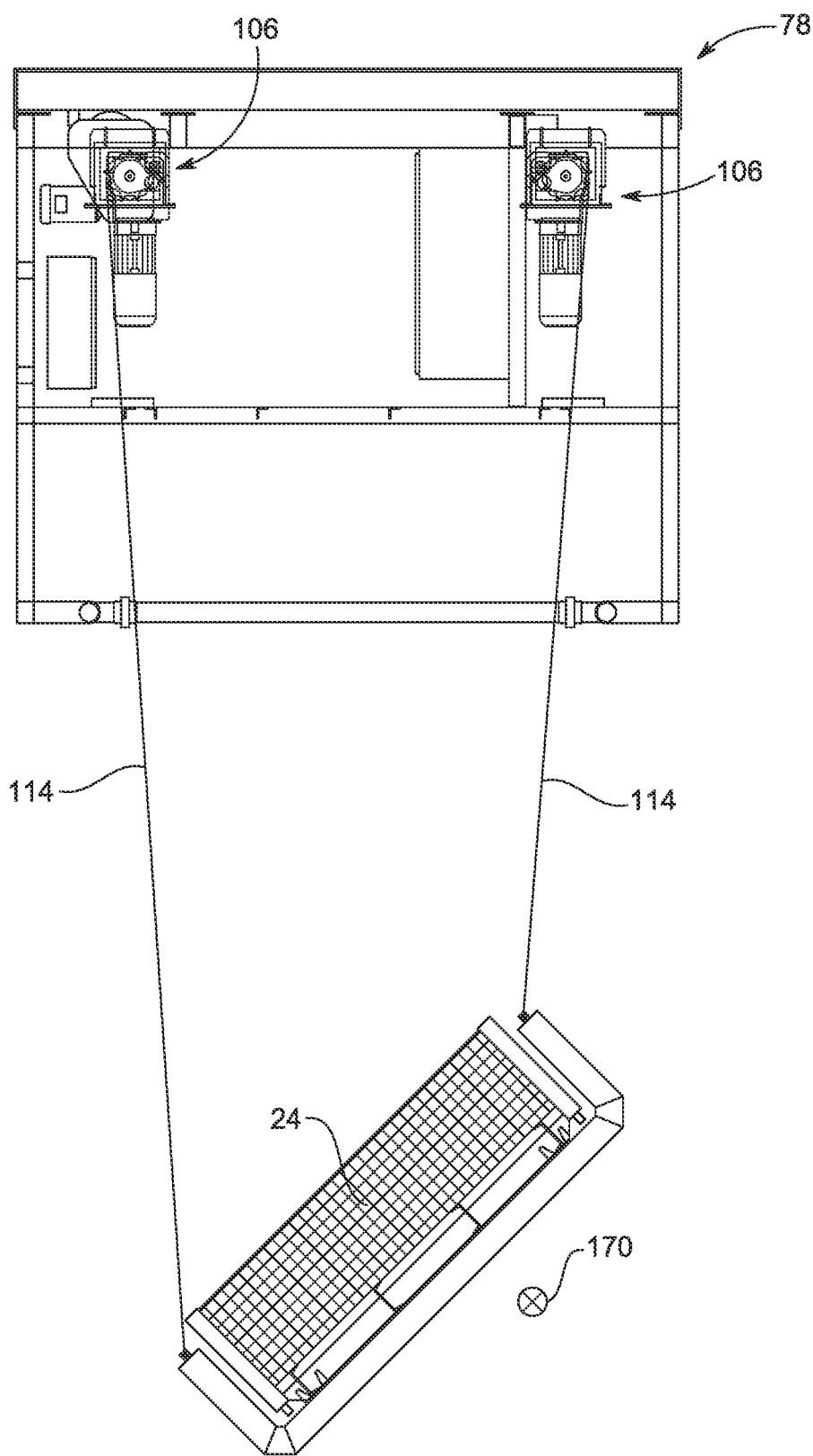
FIG. 8 is an isolated front elevation view of the hoist mechanism and a load to be finished, illustrating a side-to-side tilt of the load.

A remaining link of the e-coat circuit 80 is provided through the lifting chain 114 to the load 24 (see FIG. 8), which, when in contact with the liquid in the e-coat stages 58, 66 and charged by the rectifier 82, receives deposition of coating. The load 24 serves as a second electrode of the e-coat circuit 80. In some instances, as illustrated in FIG. 8, the load 24 may include a carrier (e.g., a workpiece holder, such as a basket, carrier, platform, and/or the like). In any sense, with respect to the example anodic e-coat arrangement described herein, the load 24 is the second electrode in the e-coat circuit 80 and serves as the anode.

Briefly referencing FIG. 8, which illustrates the load 24 supported by the lifting chain 114, the illustrated path of conduction 80 is thus linked to the load 24 and/or anode directly and/or solely through the lifting chain 114 rather than through a separate connection, such as a wire, cable, and/or the like connecting the rectifier 82 with the load 24. The absence of the separate connection for the system 20 allows for tilting and/or other complex movements of the load 24 without tangling, catching, or breaking such separate connections.

In the illustrated embodiment of FIGS. 1-9, the load 24 is retained by a workpiece holder in the form of a basket, according to one example construction. For deposition of coating in which the load 24 includes a workpiece holder, e-coating is deposited on the entire anode(s) formed by the load 24 (e.g., workpiece(s) and the holder, etc.).

Figure 10:
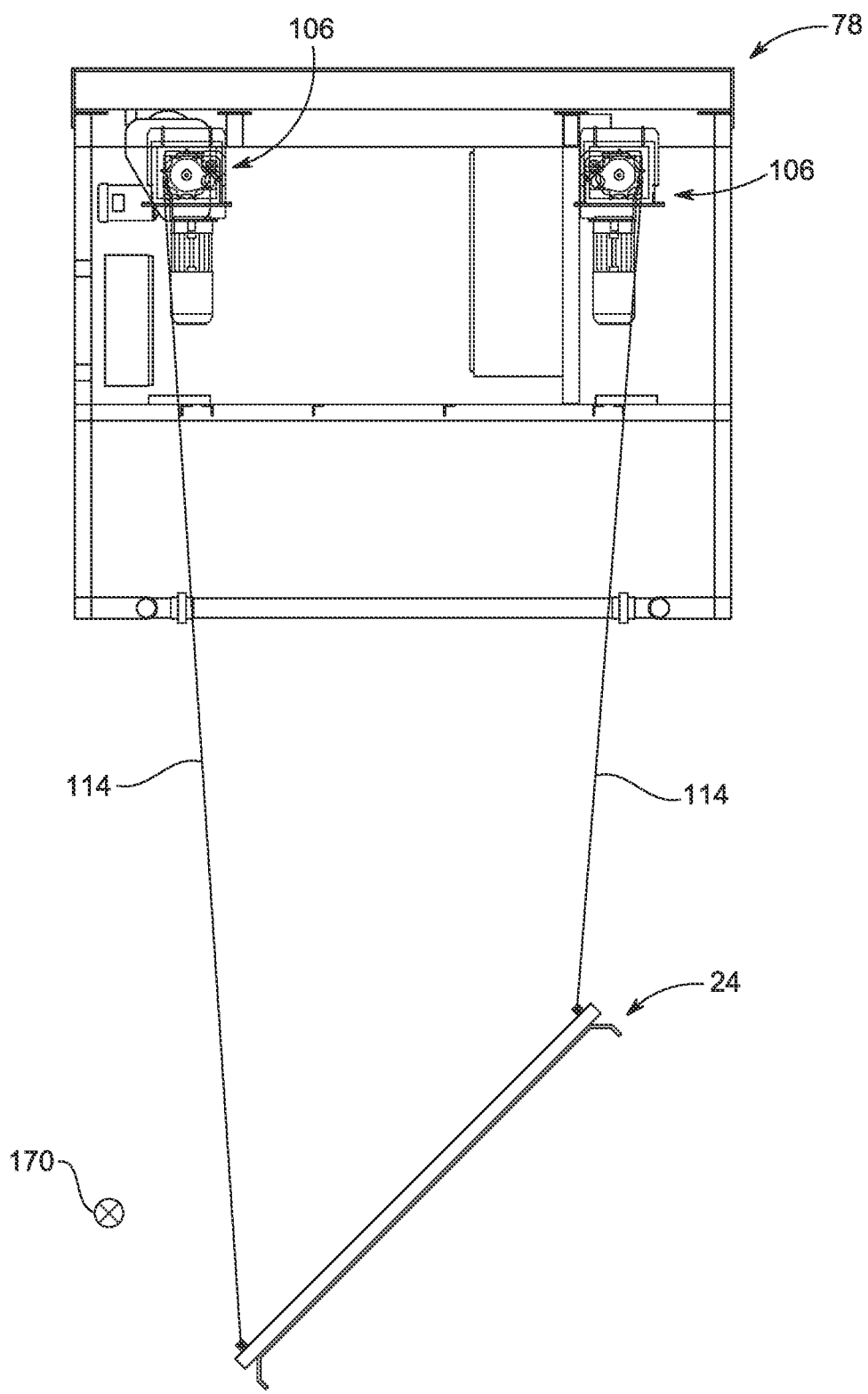
FIG. 10 is an isolated front elevation view of the hoist mechanism and a load, illustrating a side-to-side tilt of the load, according to another application of the hoist mechanism.

In another embodiment, as illustrated in FIG. 10, the load 24 does not include a separate workpiece holder and the workpiece alone constitutes the load 24, the workpiece being directly coupled to the lifting chain 114 and lowered into the coating liquid. In general, the sprocket 110 and the lifting chain 114 provide the conductive link between the moveable (e.g., vertically) workpiece and the stationary (e.g., vertically) hoist 38, such that the e-coat circuit 80 extends through the sprocket 110 and the lifting chain 114 rather than through a separate wire or connector.

With reference to FIG. 5, the hoist 78 further supports a lug 132 that is moveable, like the contact portion 100, with the hoist 78 to come into selective contact with the frame 22. Unlike the contact portion 100, the lug 132 does not contact the frame 22 to provide a part of the e-coat circuit 80. Rather, in some arrangements, the lug 132 may be provided to ground the hoist 78 with the frame 22. In other embodiments, by way of example, the lug 132 selectively contacts the frame 22 to receive power to energize the motor 120. In other embodiments, the lug 132 contacts the frame 22 to ground the entire system 20.

Referring now to FIGS. 6 and 7A-C, the sprocket 110, according to some embodiments, is a multi-piece sprocket assembly 110 including two side plates 138 (FIG. 7B), a central plate 142 (FIG. 7C) positioned between the two side plates 138, and a spacer 146 (FIG. 7A), such as a ring spacer, situated between the central plate 142 and each of the two side plates 138. The central plate 142 includes teeth 150 extending from an outer periphery of the central plate 142 and is constructed of a harder material than the two side plates 138, which may be positioned to flank the toothed central plate 142. The central plate 142 can be sandwiched between two ring spacers 146, which can be in turn situated between the two side plates 138.

Figure 7A:
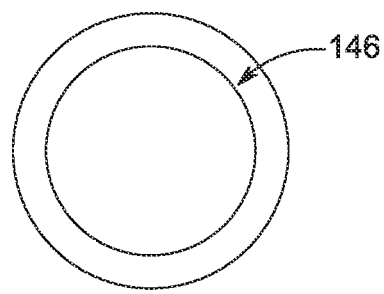
FIG. 7A is a plan view of a portion of the sprocket assembly of FIG. 6, illustrating a spacer of the sprocket assembly.
Figure 7B:
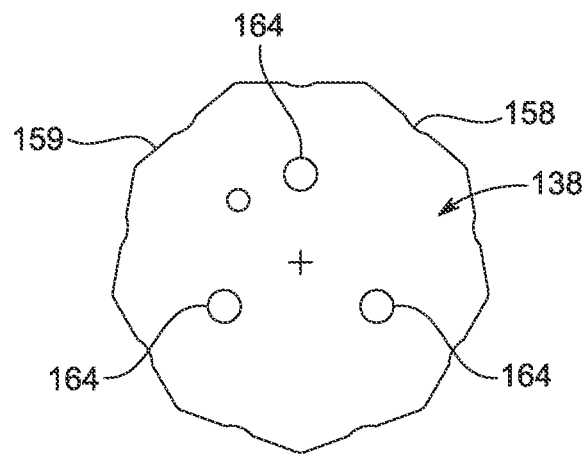
FIG. 7B is a plan view of a portion of the sprocket assembly of FIG. 6, illustrating a side plate of the sprocket assembly.
Figure 7C:
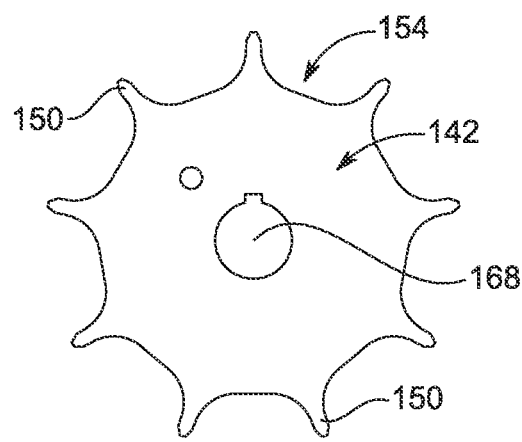
FIG. 7C is a plan view of a portion of the sprocket assembly of FIG. 6, illustrating a central plate of the sprocket assembly.

As best illustrated in FIG. 7C, consecutive teeth 150 are spaced apart by a pocket 154 at least partially situated between the two side plates 138. The teeth 150 and pockets 154 of the sprocket 110 are spaced to be alternately positioned adjacent the offset links 118 of the chain 114. Stated another way, the teeth 150 extend into links 118*a* in a first orientation, such as a horizontal or lay-down orientation, and in between adjacent links 118*b* in a second orientation, such as a vertical or stand-up orientation. The pockets 154 each receive one entire stand-up link 118*b*. The pockets 154 and the stand-up chain links 118*b* can be force-transmitting. The pockets 154 and or side plates 138 include reliefs 158 to accommodate a weld in the chain links 118. In the illustrated embodiment, an outer surface 159 of the side plates 138 includes the reliefs 158 for the lay-down links 118*a*. The lay-down chain links 118*a* are supported on both sides by the two side plates 138 and are configured to ride along the outer surface 159 (e.g., top) of the two side plates 138.

The illustrated sprocket assembly 110 includes a pitch diameter that is slightly undersized for the chain links 118 so that the chain 114 is allowed to slack and peel away from the sprocket 110 more easily on a non-driven side. The sprocket assembly 110 can be joined by plug welding at three locations 164 on each side of the assembly 110, the locations provided by through holes in the side plates 138 for penetrating the plug weld to the sides of the central plate 142. In the illustrated embodiment, the central plate 142 includes a keyed central aperture 168 that may be laser cut to be oversize (e.g., 1/32 inch) for a shaft/key (e.g., from the motor 120) due to potential damage to boring and broaching tools from the material of the central plate 142. The two side plates 138, which can be constructed of a softer or non-hardened metal as compared to the central plate 142, may be precision bored and broached (not shown in the intermediate state of FIG. 7B) for making the driving connection to the motor 120 and for providing more durability within the aperture 168.

Figure 9:
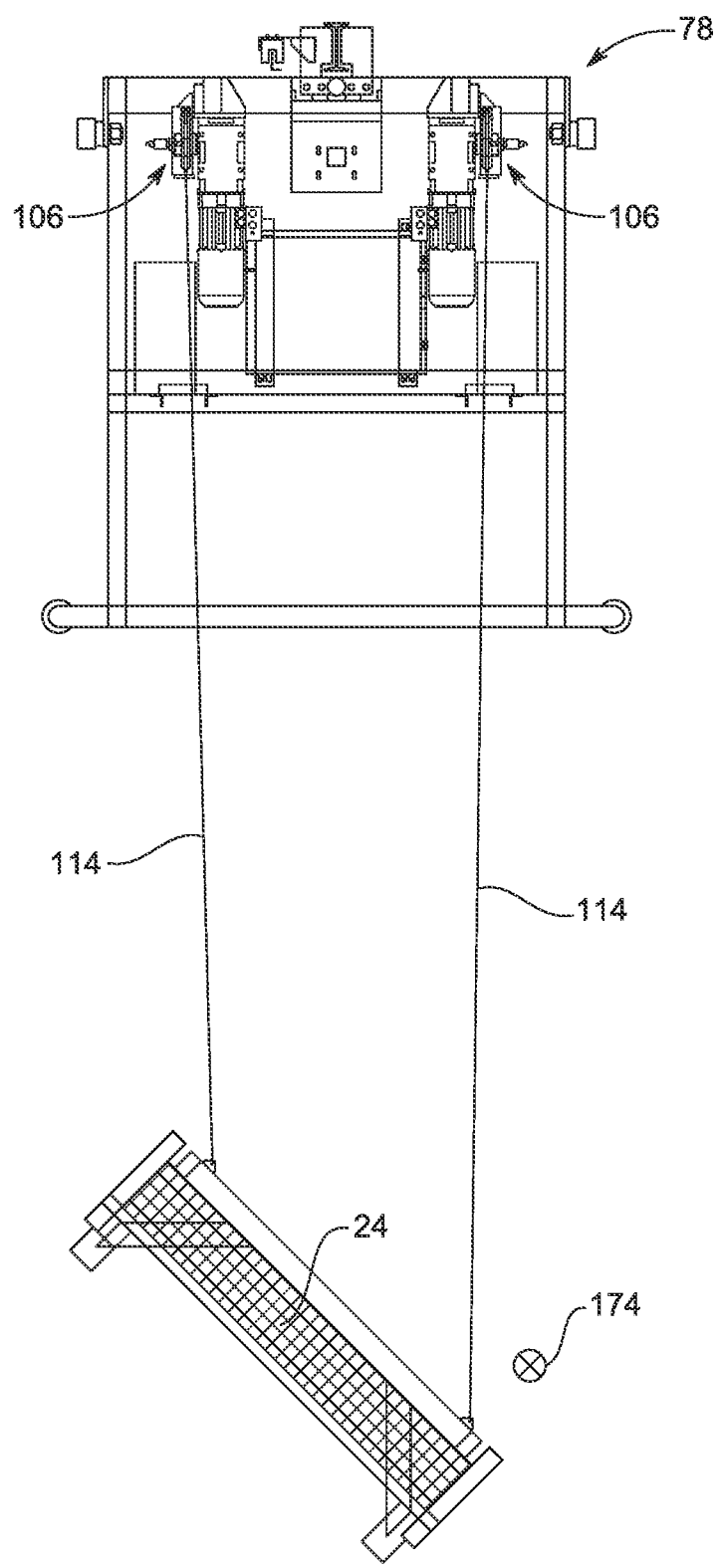
FIG. 9 is an isolated side elevation view of the hoist mechanism and the load, illustrating an end-to-end tilt of the load.

The hoist 78 may include a single lift mechanism 106, or, as illustrated in FIGS. 8 and 9, a plurality of lift mechanisms 106. In the illustrated embodiment, the hoist 78 supports lifting mechanisms 106 positioned in four separate regions (e.g., in four corners) of the hoist 78. In the illustrated embodiment, each lifting mechanism 106 includes a lifting chain 114 meshed with a sprocket assembly 110. Each lifting chain 114 can be attached to a single load 24, and the respective lifting mechanisms 106 can be driven by the same or different amounts. Each lifting mechanism 106 can be independently driven by, for example, independent motors 120 under joint control by an electronic controller or synchronized control of separate electronic controllers. In such example, different motors 120 drive different lifting mechanisms 106 by different amounts to provide a tilted load 24 or by the same amount to provide a substantially level load 24. In some embodiments, a single component, such a drive train, transmission, yoke, and/or the like may be used to drive each lifting mechanism 106 together.

As illustrated in FIG. 8, the load 24 including a workpiece holder can be supported by four lifting mechanisms 106 and tilted about a first axis 170 in a side-to-side manner. As illustrated in FIG. 9, the load 24 can be tilted about a second axis 174 in an end-to-end (e.g., front-to-rear) manner. As illustrated in FIG. 10, according to another example application of the hoist 78, the load 24 can be constituted by a workpiece alone, the workpiece connected directly to each of the four lifting chains 114 and tilted about multiple axis. In some embodiments, each lifting mechanism 106 selectively contacts the frame 22 to complete the e-coat circuit 80, however, the e-coat circuit 80 in the e-coat stages 58, 66 can be completed by only one lifting mechanism 106 contacting the frame 22 in some constructions. In other embodiments, the hoist 78 includes greater than four lifting mechanisms 106 that can collectively support the load 24 via conductive lifting chains 114 to manipulate (e.g., raise, lower, tilt, flip, etc.) the load 24 relative to the lifting mechanisms 106 and obviate a separate conductor extending from the rectifier 82 to the anode.

Although the invention has been described in detail with reference to certain preferred embodiments, variations and modifications exist within the scope and spirit of one or more independent aspects of the invention as described.

What is claimed is:

1. A finishing system comprising:
   a frame extending in a process direction along a path including a plurality of stations each configured to receive and treat a load, the plurality of stations including an immersion station in which the load is immersible in a liquid;
   a coating material suspended in the liquid, the coating material configured to be electrophoretically deposited on the load;
   a power supply operable to generate an electrical charge;
   a hoist moveable along the process direction through the plurality of stations;
   a rotary conductor supported by the hoist, the rotary conductor being electrically connected to the power supply when the hoist is positioned at the immersion station;
   an electrically conductive lifting chain configured to support the load;
   an electrically conductive sprocket coupled to the rotary conductor and meshed with the electrically conductive lifting chain, the load vertically moveable with the electrically conductive lifting chain relative to the frame in response to rotation of the electrically conductive sprocket; and
   a path of conduction between the load and the power supply established through the rotary conductor, the electrically conductive sprocket, and the electrically conductive lifting chain, wherein the electrical charge from the power supply is supplied along the path of conduction to drive electrophoretic deposition of the coating material onto the load.

2. The finishing system of claim 1, further comprising:
   a first electrode in communication with the liquid, the first electrode receiving the electrical charge from the power supply; and
   a second electrode in selective communication with the liquid and forming a part of the path of conduction, the second electrode including the load.

3. The finishing system of claim 2, wherein the second electrode is electrically connected to the electrically conductive sprocket solely through the electrically conductive lifting chain.

4. The finishing system of claim 1, further comprising:
   a first electrode in communication with the liquid, the first electrode receiving the electrical charge from the power supply;
   a second electrode in selective communication with the liquid and forming a part of the path of conduction; and
   a load holder supported by the electrically conductive lifting chain and configured to retain the second electrode,
   wherein the second electrode includes the load, and
   wherein the path of conduction between the load and the power supply further includes the second electrode and the load holder.

5. The finishing system of claim 4, wherein the load holder is electrically connected to the electrically conductive sprocket solely through the electrically conductive lifting chain.

6. The finishing system of claim 1, wherein the immersion station includes a tank, and wherein the hoist is moveable above the tank and into contact with an electrically conductive portion of the frame to form a portion of the path of conduction that extends between the rotary conductor and the power supply.

7. The finishing system of claim 6, wherein the hoist is moveable out of the immersion station to break the path of conduction between the load and the power supply.

8. The finishing system of claim 1, wherein the electrically conductive sprocket includes an assembly of two side plates and a central plate positioned between the two side plates, the assembly further including a spacer positioned between the central plate and each of the two side plates.

9. The finishing system of claim 8, wherein the electrically conductive sprocket further includes teeth extending from a periphery of the central plate, consecutive teeth being spaced apart by a pocket positioned between the two side plates, wherein the electrically conductive lifting chain includes a series of connected links each alternating in orientation relative a prior link, and wherein the teeth are configured to extend into a plurality of links of the electrically conductive lifting chain in a first orientation and the pocket is configured to receive the plurality of links of the electrically conductive lifting chain in a second orientation.

10. The finishing system of claim 9, wherein the plurality of links of the electrically conductive lifting chain in the first orientation is configured to ride along an outer surface of the two side plates, and wherein the outer surface includes a relief shaped to receive a weld of one link of the plurality of links of the electrically conductive lifting chain.

11. A finishing system comprising:
    a frame extending in a process direction along a path including a bath station configured to communicate with an electrode;
    a hoist supported by the frame and movable into register with the bath station to establish electrical communication between the hoist and a current generated by a power source, the current to driving deposition of a coating onto a load carried by the hoist; and
    a drive assembly supported by the hoist and operable to rotate a sprocket, the sprocket configured to vertically move the load, the drive assembly including
    a rotary conductor electrically coupled to the sprocket and configured to come into electrical communication with the frame, and
    an electrically conductive lifting chain drivably meshed with the sprocket and supporting the load, the electrically conductive lifting chain being operable through rotation of the sprocket to lower the load into the bath station in which the load is immersed in a liquid and raise the load out of the liquid, wherein the frame communicates current from the power source to the rotary conductor, and wherein the electrically conductive lifting chain communicates current from the rotary conductor to the load.

12. The finishing system of claim 11, wherein the drive assembly is a first drive assembly of a plurality of drive assemblies each supporting the load.

13. The finishing system of claim 12, wherein the hoist supports the first drive assembly on a first side of the hoist and a second drive assembly on a second side of the hoist, and wherein the first and second drive assemblies are operable to drive respective first and second electrically conductive lifting chains by different amounts to thereby tilt the load.

14. The finishing system of claim 13, wherein the hoist supports a third drive assembly on the first side of the hoist and a fourth drive assembly on the second side of the hoist, and wherein the third and fourth drive assemblies are operable to rotate respective third and fourth electrically conductive lifting chains by different amounts to thereby by tilt the load.

15. The finishing system of claim 14, wherein the first and third drive assemblies are offset relative one another, and wherein the second and fourth drive assemblies are offset relative one another.

16. The finishing system of claim 15, wherein the respective first, second, third, and fourth electrically conductive lifting chains are connected to four corners of the load.

* * * * *